2,950,263
PREPARATION OF FOAMED CASTOR OIL CITRATE-ORGANIC POLYISOCYANATE REACTION PRODUCTS

William Abbotson, Reginald Hurd, and Herbert Jackson Shearing, Manchester, England, assignors to Imperial Chemical Industries Limited, London, England, a corporation of Great Britain No Drawing. Filed May 2, 1958, Ser. No. 732,450

Claims priority, application Great Britain May 10, 1957

4 Claims. (Cl. 260—2.5)

This invention relates to the manufacture of polymeric materials and more particularly to the manufacture of foamed polyurethanes.

It has already been proposed to manufacture foamed or cellular polyurethanes from polyurethane-forming ingredients such as hydroxyl-containing polyesters and polyisocyanates using catalysts such as tertiary amines and optionally other ingredients such as water, surface active agents, fillers, pigments, etc.

It is an object of the present invention to provide a process for the manufacture of foamed polyurethanes wherein readily available cheap materials free from toxic hazard are used and which is easily controlled and does not require the use of complicated mixing machinery.

According to the present invention there is provided a process for the manufacture of foamed polyurethanes by interacting hydroxyl-containing materials with polyisocyanates in the presence of a catalyst and water characterised in that as hydroxyl-containing material there is used castor oil citrate.

The castor oil citrate used in the process of this invention is preferably prepared by reacting 1 molecular proportion of castor oil with 0.6 to 1.2 molecular proportions, preferably 0.8 to 1.0 molecular proportion, of citric acid until the acid value of the mixture has fallen to between 45 and 75 mg. KOH per gm. The reaction may be performed at an elevated temperature, up to about 170° C., in an inert atmosphere.

Any polyisocyanate, as proposed in the prior art, may be used in the process of the present invention. Thus there may be used for example 2:4- and 2:6-tolylene diisocyanates or diphenylmethane diisocyanates. Preferably the polyisocyanate used is a polyisocyanate composition comprising a major proportion of diphenylmethane diisocyanate and at least 5% by weight of polyisocyanate of functionality greater than two and sufficient carbamyl chloride derivatives to provide an ionisable chlorine content of 0.01% to 3.0%, preferably 0.1% to 1.0% by weight, as more fully described in Serial No. 695,492. Suitable proportions of such a polyisocyanate are from 15% to 200% of the weight of the castor oil citrate. When low proportions, from about 15% to 30%, the foamed polyurethanes produced tend to be flexible. As the proportion of polyisocyanate is increased the foamed product becomes more rigid.

Tertiary amines that may be used as catalysts include 1:3:5-tris(2-diethylaminoethyl) hexahydro-s-triazine, N-ethylpiperidine, N:N - diethylcyclohexylamine, diethylaminopropionamide, tributylamine, α-picoline, N-methylmorpholine, triethylamine, 2:4:6 - tris(dimethylaminomethyl)phenol, N:N-dimethylcyclohexylamine, diethylaminopropylsuccinimide, N:N - dimethylbenzylamine. Suitable proportions of catalyst are from 2% to 8% of the weight of castor oil citrate; 3% to 6% is the preferred range.

By the process of this invention foamed polyurethanes can be made from non-toxic ingredients by simple continuous or batchwise mixing techniques. Accordingly the invention is especially valuable in the manufacture of foamed polyurethanes in confined spaces, without the need for extractor fans or gas-masks.

The invention is illustrated but not limited by the following examples in which parts and percentages are by weight.

Example 1

25.4 parts of castor oil are added to 4.6 parts of citric acid in a 4 gallon varnish pan fitted with a condenser, thermometer, stirrer and an inlet for inert gas. The mixture is heated to a temperature of 176–178° C. and carbon dioxide is passed through. The reaction mixture is held at this temperature until the acid value has fallen to 62 mg. KOH/g.

Semi-rigid foamed polyurethanes can be formed from this resin by reacting it, plus added water, with a polyisocyanate in the presence of a tertiary amine.

It is possible to prepare a foam in the absence of the tertiary amine but the product obtained is of a higher density and technically it is an inferior material.

400 parts of the above resin are mixed with 20 parts of a 20% solution of a condensation product of 1 molecular proportion of octyl phenol and 10 molecular proportions of ethylene oxide in water and 20 parts of N:N-dimethylcyclohexylamine, until a smooth emulsion is formed. 400 parts of a polyisocyanate are added and the reactants are vigorously mixed for about 1 minute. The mixture is then poured into a mould and allowed to foam in situ. A fine textured low density semi-rigid foam is obtained.

The polyisocyanate used in this example was prepared as follows:

One mole of formaldehyde is reacted with a mixture of about 4 moles of aniline and about 1 mole of aqueous hydrochloric acid first at about 0° C. and finally at 70–90° C. for about 6 hours. The product is neutralised, the oil is separated and unreacted aniline is distilled off under reduced pressure. As thus prepared, diaminodiphenylmethane contains in addition to 2:4'- and 4:4'-diaminodiphenylmethane, about 15% by weight of polyamines which are mainly triamines. This crude diamine as a solution in o-dichlorbenzene is added to a solution of at least 1 molar proportion of phosgene in o-dichlorbenzene at about 0° C., the mixture being stirred with exclusion of moisture. The resulting suspension of the carbamyl chloride-hydrochloride reaction product is treated further with phosgene, finally at a temperature of 165–175° C. until reaction is complete as indicated by virtual absence of hydrogen chloride in effluent gases. A rapid stream of nitrogen is then passed into the mixture for several hours at 165–175° C. to remove dissolved phosgene. The reaction mixture is filtered from any undissolved matter and o-dichlorbenzene is substantially completely distilled from the filtrate at a pressure of 20–30 mm. until the temperature of the still contents rises to 140–150° C. The resulting diphenylmethane diisocyanate composition is a brown oil of strength about 87% calculated as diphenylmethane diisocyanate and has an ionisable chlorine content of 0.5%. The polyisocyanate content, as represented by the high boiling residue remaining after the distillation of the diphenylmethane diisocyanate at 130–150° C./2–3 mm. amounts to about 30%. In addition to polyisocyanates arising from the polyamines in the crude diamine, this high boiling residue also contains polyisocyanates present as isocyanurate polymers formed in the phosgenation process; these may be detected in the diphenylmethane diisocyanate composition by the presence in its infra red spectrum of absorption bands at 5.85 and 7.05 microns.

Example 2

100 parts of the resin described in Example 1 mixed with 5 parts of a 20% solution of a condensation product of 1 molecular proportion of octyl phenol and 10 molecular proportions of ethylene oxide in water and 3 parts of 1:3:5 - tris(2 - diethylaminoethyl)hexahydro-s-triazine until a smooth emulsion is formed. 80 parts of the polyisocyanate used in Example 1 are added and the reactants are vigorously mixed for about 1 minute; the mixture is then poured into a mould and allowed to foam in situ.

Example 3

100 parts of the resin described in Example 1 are mixed with 5 parts of a 20% solution of a condensation product of 1 molecular proportion of octyl phenol and 10 molecular proportions of ethylene oxide in water and 5 parts of N:N-dimethylbenzylamine until a smooth emulsion is formed. 100 parts of the polyisocyanate used in Example 1 are added and the reactants are vigorously mixed for about 1 minute; the mixture is then poured into a mould and allowed to foam in situ. A fine textured semi-rigid foam is obtained.

What we claim is:

1. Process for the manufacture of foamed polyurethanes which comprises reacting castor oil citrate with between about 15 and 200% of organic polyisocyanate by weight of said castor oil citrate in the presence of a tertiary amine catalyst and water, the castor oil citrate being prepared by reacting one molecular proportion of castor oil with 0.6 to 1.2 molecular proportion of citric acid until the acid value of the mixture has fallen to between 45 and 75 mg. KOH per gm.

2. Process for the manufacture of foamed polyurethanes as claimed in claim 1 wherein the polyisocyanate used is a polyisocyanate composition comprising a major proportion of diphenylmethane diisocyanate and at least 5% by weight of organic polyisocyanate having more than two isocyanate groups per molecule and a sufficient amount of a carbamyl chloride derivative of said isocyanate to provide an ionisable chlorine content of 0.01% to 3.0%.

3. The process of claim 2 wherein said polyisocyanate having more than two isocyanate groups per molecule is a triisocyanate.

4. Process for the manufacture of a foamed polyurethane which comprises reacting a castor oil citrate with an organic polyisocyanate in the presence of a tertiary amine catalyst and water using from 15 to 200% of polyisocyanate and 2% to 8% of catalyst, both based on the weight of citrate, the castor oil citrate being prepared by reacting one molecular proportion of castor oil with 0.6 to 1.2 molecular proportions of citric acid until the acid value of the mixture has fallen to between 45 and 75 mg. KOH per gm.

References Cited in the file of this patent
UNITED STATES PATENTS 2,787,601    Detrick et al. _____ Apr. 2, 1957